United States Patent
Sung et al.

(10) Patent No.: US 8,043,031 B2
(45) Date of Patent: Oct. 25, 2011

(54) MULTI FUNCTION CUTTING TOOL

(75) Inventors: Wook Jung Sung, Chungcheongbuk-do (KR); Sang Yong Lee, Gyeongsangnam-do (KR)

(73) Assignee: Korloy Inc., Seoul (KR)

( * ) Notice: Subject to any disclaimer, the term of this patent is extended or adjusted under 35 U.S.C. 154(b) by 366 days.

(21) Appl. No.: 12/445,541

(22) PCT Filed: Dec. 17, 2007

(86) PCT No.: PCT/KR2007/006568
§ 371 (c)(1),
(2), (4) Date: Apr. 14, 2009

(87) PCT Pub. No.: WO2008/082101
PCT Pub. Date: Jul. 10, 2008

(65) Prior Publication Data
US 2010/0054872 A1    Mar. 4, 2010

(30) Foreign Application Priority Data
Dec. 28, 2006    (KR) .................. 10-2006-0136579

(51) Int. Cl.
*B23C 5/20* (2006.01)
*B23C 5/10* (2006.01)
(52) U.S. Cl. ................................ 407/42; 407/113
(58) Field of Classification Search ............ 407/42, 407/48, 113, 114, 115, 116
See application file for complete search history.

(56) References Cited

U.S. PATENT DOCUMENTS

| | | | | |
|---|---|---|---|---|
| 4,597,695 A * | 7/1986 | Johnson | ............. | 407/113 |
| 5,004,380 A * | 4/1991 | Hessman et al. | ............. | 407/114 |
| 5,388,932 A * | 2/1995 | DeRoche et al. | ............. | 407/113 |
| 6,142,716 A * | 11/2000 | Jordberg et al. | ............. | 407/114 |
| 6,193,446 B1 * | 2/2001 | Astrom et al. | ............. | 407/114 |
| 7,549,824 B2 * | 6/2009 | Agic | ............. | 407/42 |
| 7,905,688 B2 * | 3/2011 | Ertl et al. | ............. | 407/42 |

FOREIGN PATENT DOCUMENTS

| | | |
|---|---|---|
| KR | 10-0320127 | 1/2002 |
| KR | 10-0558249 | 3/2006 |
| KR | 10-0576320 | 5/2006 |

* cited by examiner

*Primary Examiner* — Will Fridie, Jr.
(74) *Attorney, Agent, or Firm* — Boyle Fredrickson, S.C.

(57) ABSTRACT

A multi-function cutting tool is disclosed. The multi-function cutting tool includes a cutting insert (200) and a cutter body (300). The cutting insert has an upper surface (201), a lower surface (205), and first and second cutting edge corner parts (210) and (220), which are provided on the upper surface such that the upper surface has a symmetrical structure with respect to a diagonal direction. The cutting insert further has a major cutting edge part (230), a first minor cutting edge part (240), and a lowered cutting edge part (250). The major cutting edge part has a downwardly inclined angle ranging from 3° to 10°, and extends from the first cutting edge corner part towards the corresponding second cutting edge corner part. When seen in the front view of the cutting insert, the major cutting edge is defined by a convex curved line, which has a curvature radius of 1000 mm or more.

10 Claims, 5 Drawing Sheets

MULTI FUNCTION CUTTING TOOL

BACKGROUND OF THE INVENTION

1. Field of the Invention

The present invention relates, in general, to multi-function cutting tools and, more particularly, to a multi-function cutting tool, in which the side surfaces of a cutting insert are perpendicular to the lower surface of the cutting insert, so that the stiffness of the cutting insert can be increased, and the cutting insert can be securely fastened to a cutter body, thus making it possible to stably conduct a cutting operation despite the realization of high feed, high speed and high depth cutting.

2. Description of the Related Arts

Generally, cutting tools are used to cut iron, nonferrous metals, and nonmetallic workpieces. Typically, cutting tools are attached by machines and cut workpieces to form them into desired shapes. Such a cutting tool includes a cutting insert, which has a cutting edge, and a body, which supports the cutting insert.

Meanwhile, as methods of cutting a metallic workpiece using the cutting tool, there are two representative methods. First, there is a cutting method in which a workpiece, which is rotated, is brought into contact with the cutting edge of a cutting tool, which is stationary. Second, there is a cutting method, in which a tool having a cutting edge, that is, a cutting insert, is fixed to a machine using a tool holder, and, in this state, the cutting insert is rotated and is brought into contact with a workpiece, which is stationary, thus forming the workpiece into a desired shape.

Milling is a representative example of the second cutting method. A milling cutter conducts a facing process, a shouldering process, a grooving process, a boring process, etc. In the shoulder cutting process as the cutting depth increases, the length of the part of each cutting insert that is involved in the cutting is increased, so that the resistance applied to the entire cutting insert is also increased. Various efforts have been conducted to efficiently disperse the resistance such that the cutting inserts can easily withstand a load, and thus increase the tool life of the cutting tool despite the realization of high feed, high speed and high depth cutting.

However, in a conventional multi-function cutting tool, a cutting insert has a slanted relief face, so that the strength thereof is relatively low. Furthermore, when the cutting insert is mounted to a cutter body, because the slanted clearance relief faces are in contact with the cutter body, the stability with which the cutting insert is mounted to the cutter body is reduced, thus reducing the tool life of the cutting tool.

SUMMARY OF THE INVENTION

Accordingly, the present invention has been made keeping in mind the above problems occurring in the prior art, and an object of the present invention is to provide a multi-function cutting tool, in which the relief face of a cutting insert are perpendicular to the lower surface of the cutting insert, so that the stiffness of the cutting insert can be increased, and the cutting insert is securely fastened to a cutter body, thus making it possible to stably conduct a cutting operation despite the realization of high feed, high speed and high depth cutting.

In order to accomplish the above object, the present invention provides a multifunction cutting tool, including: a cutting insert, including an upper surface, a lower surface, first cutting edge corner parts and second cutting edge corner parts, which are provided on respective corners of the upper surface such that the upper surface has a symmetrical structure with respect to a diagonal direction, a major cutting edge part provided between each of the first cutting edge corner parts and one second cutting edge corner part, and a first minor cutting edge part and a lowered cutting edge part provided between each of the first cutting edge corner parts and the remaining second cutting edge corner part; and a cutter body for supporting the cutting insert thereon, wherein the major cutting edge part has a downwardly inclined angle ranging from 3° to 10°, and extends from the first cutting edge corner part towards the corresponding second cutting edge corner part, and, when seen in a front view of the cutting insert, the major cutting edge is defined by a convex curved line, which has a curvature radius of 1000 mm or more, the cutting insert further including a second minor cutting edge part provided between the major cutting edge part and the second cutting edge corner part.

In the multi-function cutting tool, a circular opening may be perpendicularly formed through a central portion of the cutting insert, so that the cutting insert is mounted to the cutter body through the circular opening.

Furthermore, a major cutting edge side surface, connected between each of the major cutting edge parts and the lower surface, a second corner side surface, connected between each of the second cutting edge corner parts and the lower surface, a second minor cutting edge side surface, connected between each of the second minor cutting edge parts and the lower surface, and a lowered cutting edge side surface, connected between each of the lowered cutting edge part and the lower surface, may be perpendicular to the lower surface.

In addition, the cutting insert may further include a first minor cutting edge side surface and a first corner side surface, extending from each of the first minor cutting edge parts and from each of the first corner cutting edge parts, respectively, towards the corresponding lowered cutting edge side surface at inclination angles ranging from 5° to 20°.

As well, a height of a protruding portion of the first minor cutting edge side surface may be equal to or less than a height of the cutting insert.

The first minor cutting edge part may be further than the lowered cutting edge part from a center of the cutting insert by a distance ranging from 0.5 mm to 1.5 mm.

The above and other objects, features and advantages of the present invention will be more clearly understood from the following detailed description taken in conjunction with the accompanying drawings. The terms and words used in the specification and claims must be regarded as having concepts selected by the inventor as the best method of illustrating the present invention, and must be interpreted as having meanings and concepts adapted to the scope and spirit of the present invention for understanding the technology of the present invention.

In a multi-function cutting tool according to the present invention, a cutting insert is configured such that first corner side surfaces, second corner side surfaces, major cutting edge side surfaces and lowered cutting edge side surfaces thereof are perpendicular to a planar lower surface. Therefore, there is an advantage in that the stiffness of the cutting insert is increased compared to a conventional cutting insert.

Furthermore, because the major cutting edge side surfaces and the lowered cutting edge side surfaces of the cutting insert are perpendicular to the lower surface thereof, when the cutting insert is mounted to a cutter body, the cutting insert can be more stably and securely seated onto and fastened to the cutter body than in the conventional technique. Therefore, in various cutting processes, for example, a planning process, a side surface cutting process, a grooving process, an inclined cutting process, etc., despite poor cutting conditions, in which a cutting load is relatively large in order to realize high feed, high speed and high depth cutting, the present invention can stably conduct the cutting process.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE PREFERRED EMBODIMENT

Figure 1:
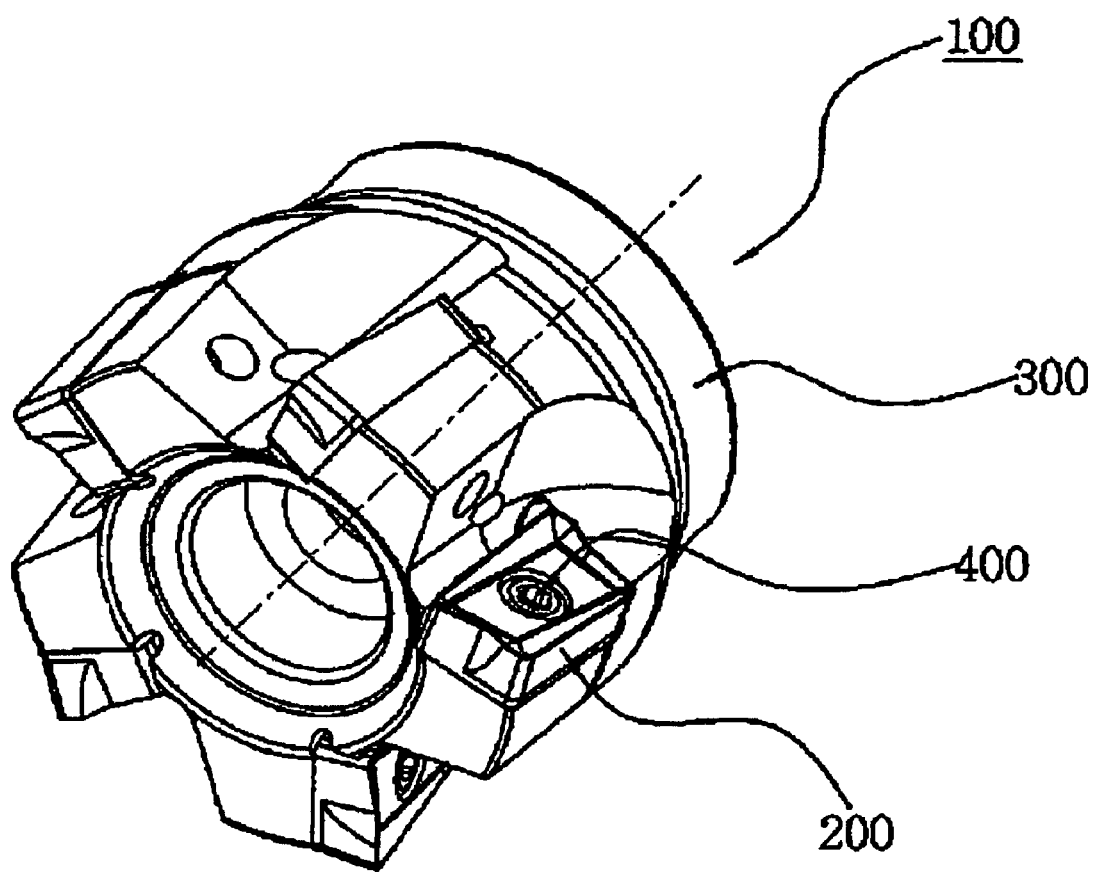
FIG. 1 is a perspective view of a multi-function cutting tool, according to the present invention.

The above and other objects, features and advantages of the present invention will be more clearly understood from the following detailed description.

Hereinafter, a preferred embodiment of the present invention will be described with reference to the attached drawings.

Reference now should be made to the drawings, in which the same reference numerals are used throughout the different drawings to designate the same or similar components. Furthermore, in the description of the present invention, a detailed explanation of well-known techniques and constructions will be omitted in order to more clearly describe the gist of the present invention.

FIG. 1 is a perspective view illustrating a multi-function cutting tool, according to the present invention. As shown in the drawing, the multi-function cutting tool 100 according to the present invention includes a plurality of cutting inserts 200, a cutter body 300, which supports the cutting inserts 200 thereon, and screws 400, which fasten the respective cutting inserts 200 to the cutter body 300.

Figure 2:
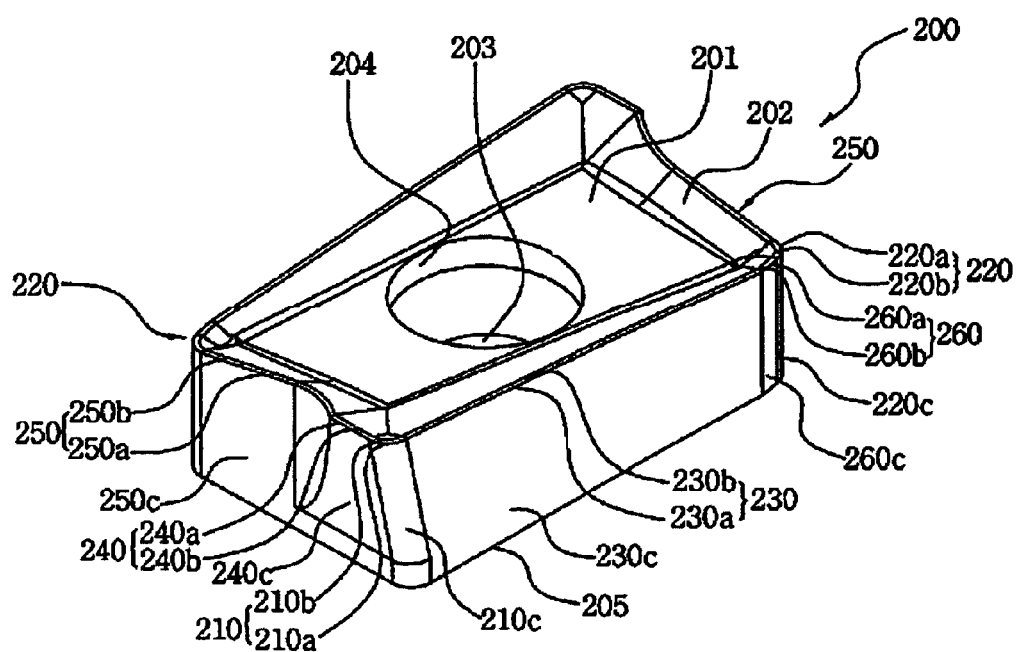
FIG. 2 is a perspective view showing an enlargement of a cutting insert of FIG. 1.
Figure 3:
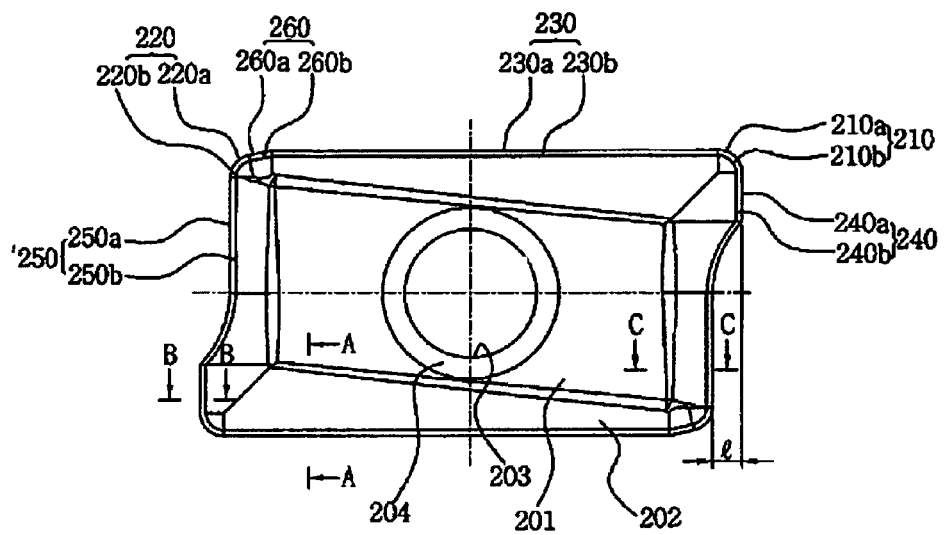
FIG. 3 is a plan view of the cutting insert of FIG. 2.
Figure 4:
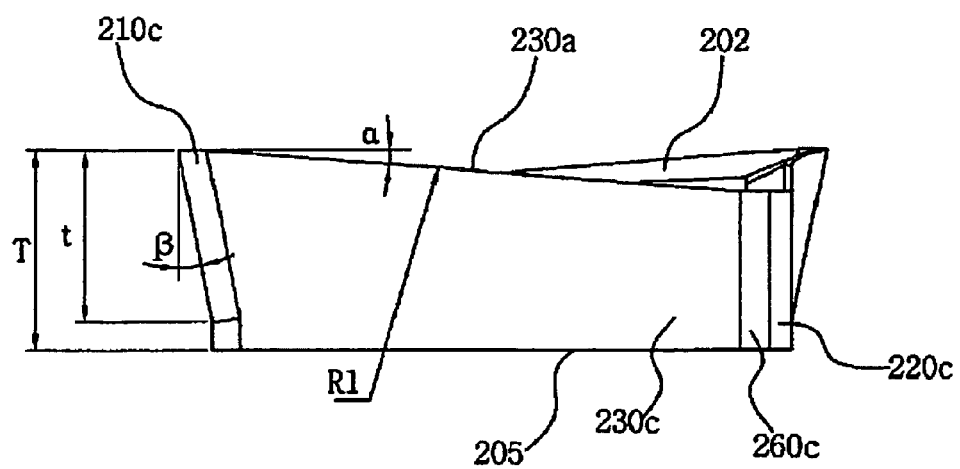
FIG. 4 is a front view of the cutting insert of FIG. 2.
Figure 5:
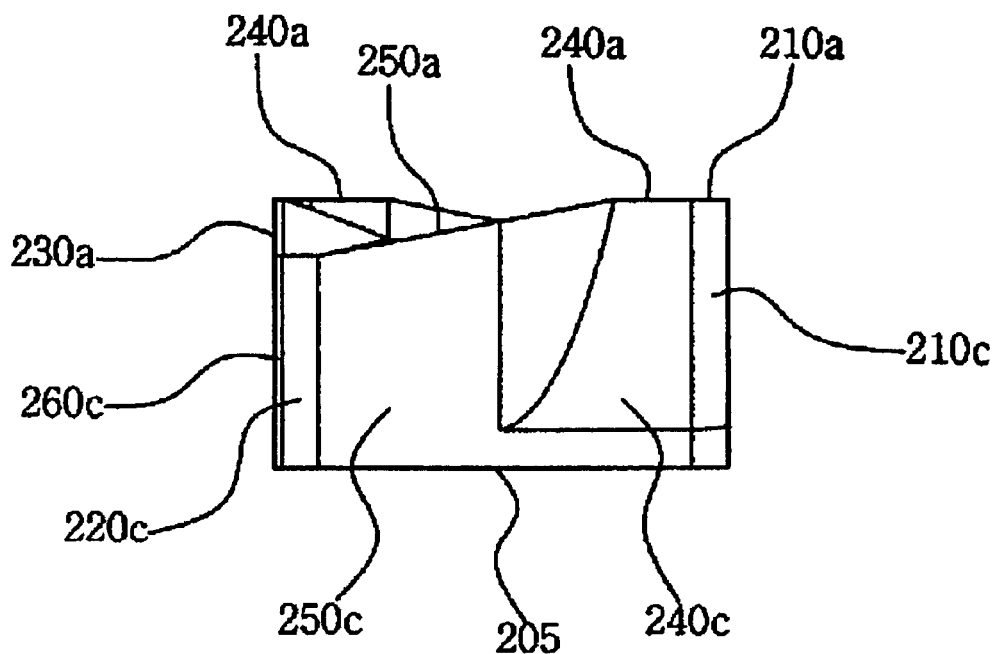
FIG. 5 is a side view of the cutting insert of FIG. 2.
Figure 6:
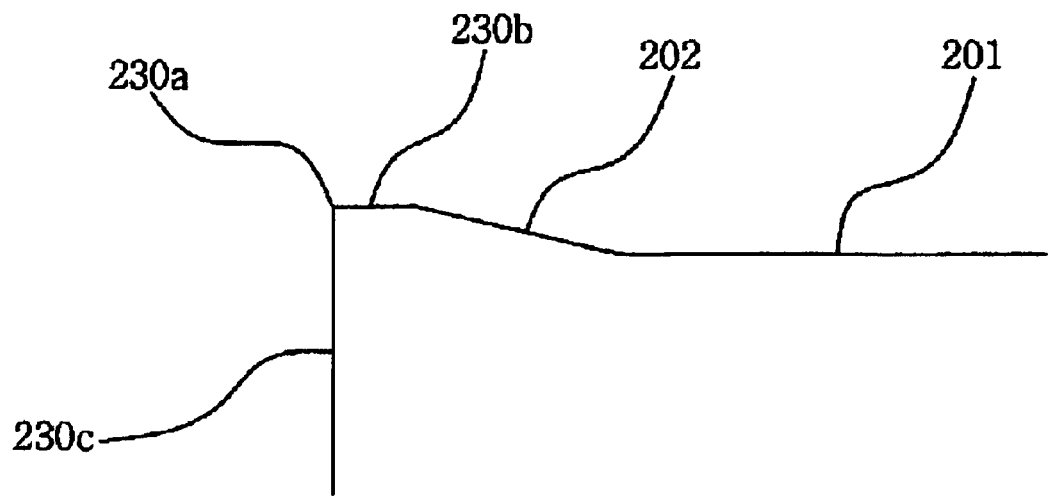
FIG. 6 is a sectional view taken along the line A-A of FIG. 2.
Figure 7:
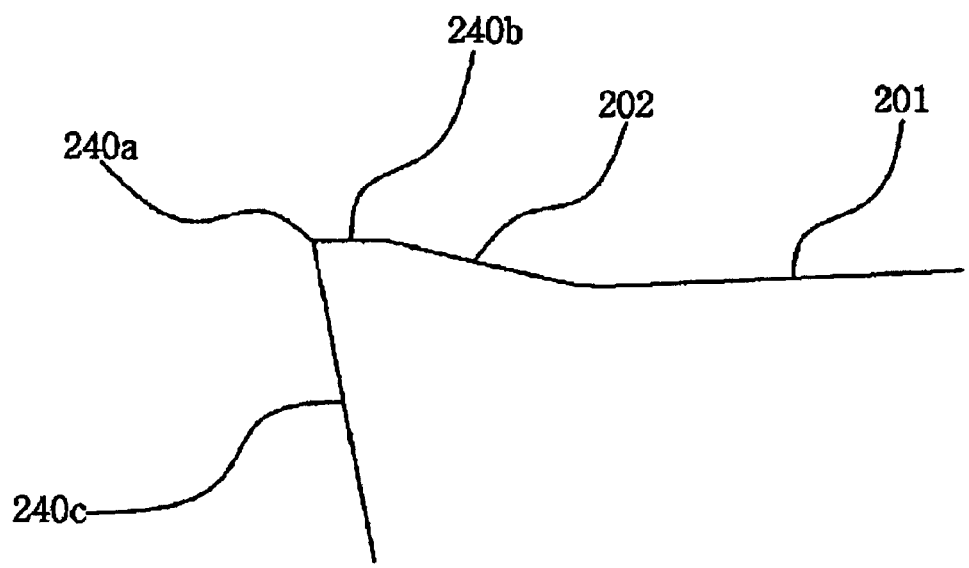
FIG. 7 is a sectional view taken along the line B-B of FIG. 2.
Figure 8:
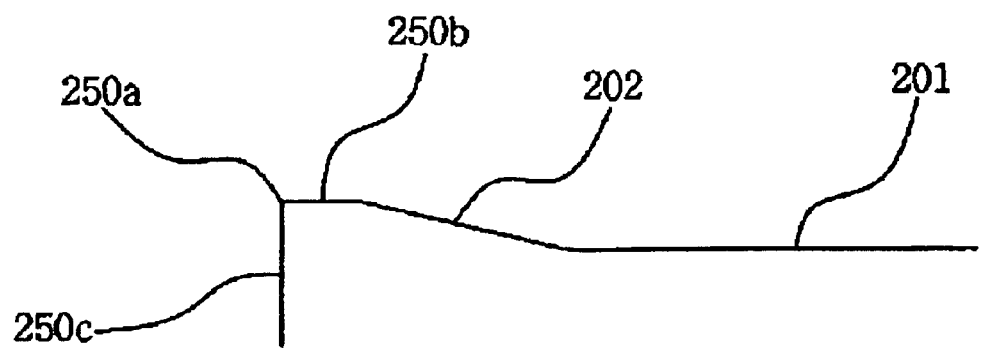
FIG. 8 is a sectional view taken along the line C-C of FIG. 2.

FIG. 2 is a perspective view showing an enlargement of one cutting insert of FIG. 1. FIG. 3 is a plan view of the cutting insert of FIG. 2. FIG. 4 is a front view of the cutting insert of FIG. 2. FIG. 5 is a side view of the cutting insert of FIG. 2. FIG. 6 is a sectional view taken along the line A-A of FIG. 2. FIG. 7 is a sectional view taken along the line B-B of FIG. 2. FIG. 8 is a sectional view taken along the line C-C of FIG. 2.

Referring to FIGS. 2 through 8, the cutting insert 200 of the present invention is made of cemented carbide through powder metallurgy, including a die stamping process, a sintering process, a grinding process, etc. In the cutting insert 200, only an upper surface 201 is used when cutting iron or a nonferrous metallic substance. For this reason, chip breakers 202 are provided only on the upper surface 201.

A circular opening 203 is vertically formed through the central portion of the cutting insert 200. A locking boss 204 is provided in the circular opening 203, so that the cutting insert 200 is locked to the cutter body 300 using the locking boss 204.

The cutting insert 200 of the present invention has a 180° rotationally symmetrical structure based on the circular opening 203. In detail, the cutting insert 200 includes first cutting edge corner parts 210 and second cutting edge corner parts 220, which are provided in respective corners of the upper surface 201 such that the upper surface 201 has a symmetrical structure with respect to a diagonal direction.

Each first cutting edge corner part 210 includes a first corner cutting edge 210a and a first corner cutting edge land surface 210b. Each second cutting edge corner part 220 includes a second corner cutting edge 220a and a second corner cutting edge land surface 220b. The first corner cutting edge 210a and the second corner cutting edge 220a, which are mainly used when conducting a milling operation, have predetermined curvatures.

Furthermore, a major cutting edge part 230 is provided between the first cutting edge corner part 210 and one second cutting edge corner part 220. A first minor cutting edge part 240 and a lowered cutting edge part 250 are provided between the first cutting edge corner part 210 and the remaining second cutting edge corner part 220. The first minor cutting edge part 240 is provided to increase the surface roughness of a cut workpiece, and includes a first minor cutting edge 240a and a first minor cutting edge land surface 204b. The lowered cutting edge part 250 includes a lowered cutting edge 250a and a lowered cutting edge land surface 250b. The first minor cutting edge part 240 is parallel to the adjacent lowered cutting edge part 250. In addition, the first minor cutting edge part 240 is farther than the lowered cutting edge part 250 from the circular opening 203. Here, the parallel distance I between the lowered cutting edge part 250 and the first minor cutting edge part 240 ranges from 0.5 mm to 1.5 mm. Preferably, the parallel distance I ranges from 0.7 mm to 1.2 mm. Meanwhile, a second minor cutting edge part 260 is provided between the major cutting edge part 230 and the corresponding second cutting edge corner part 220. When the lowered cutting edge part 250 is used as a major cutting edge to conduct a planning operation, the second minor cutting edge part 260 serves to increase the surface roughness of a cut workpiece. The second minor cutting edge part 260 includes a second minor cutting edge 260a and a second minor cutting edge land surface 260b.

When a cutting process is conducted, the major cutting edge part 230 first contacts and cuts the workpiece. The major cutting edge part 230 is provided on each of the boundaries between the upper surface 201 and major cutting edge side surfaces 230c and includes a major cutting edge 230a and a major cutting edge land surface 230b. The major cutting edge 230a has a downwardly inclined angle α ranging from 3° to 10°, and extends from each first cutting edge corner part 210 towards the corresponding second cutting edge corner part 220. Furthermore, when seen in the front view of the cutting insert 200, the major cutting edge 230a is defined by a convex curved line, which has a curvature radius R1 of 1000 mm or more.

Referring to FIG. 3, the upper surface 201 is configured such that it is planar and such that it is lower than the first cutting edge corner part 210, the second cutting edge corner part 220 and the major cutting edge part 230. A lower surface 205 is also planar, such that the cutting insert 200 can be stably and securely seated onto and fastened to the cutter body 300.

Referring to FIGS. 4 through 8, the major cutting edge side surfaces 230c, second corner side surfaces 220c, second minor cutting edge side surfaces 260c and lowered cutting edge side surfaces 250c are perpendicular to the lower surface 205.

Furthermore, a seating side surface (not shown) of the cutter body 300, onto which the cutting insert 200 is seated, is at an obtuse angle relative to a seating bottom (not shown) of the cutter body 300, which is greater than 90°, or is at an angle of 90° or less relative thereto, so that the cutting insert 200 can be reliably seated onto the cutter body.

Each first minor cutting edge side surface 240c and each first corner side surface 210c are angled towards the corresponding lowered cutting edge side surface 250c with respect to imaginary lines, which vertically extend downwards from the corresponding first minor cutting edge 240a and the corresponding first corner cutting edge 210a, at angles β ranging from 5° to 20° and, preferably, at angles β ranging from 7° to 15°. In other words, the first minor cutting edge side surface 240c and the first corner side surface 210c are inclined side surfaces. As such, the first minor cutting edge side surface 240c, which is an inclined side surface, is constructed such that, when the cutting insert 200 is coupled to the cutter body 300, the inclined angle thereof is a positive (+) value with respect to the axial direction. Therefore, when the cutting process is conducted, cutting resistance can be reduced, and the quality of the cut surface of the workpiece can be enhanced. Meanwhile, each first minor cutting edge side surface 240c and the corresponding lowered cutting edge side surface 250c are connected to each other and form a rounded shape.

Preferably, the height t of a protruding portion of the first minor cutting edge side surface 240c is equal to or less than the height T of the cutting insert 200.

Those skilled in the art will appreciate that the present invention is not limited to the preferred embodiment and the attached drawings, and that various modifications, additions and substitutions are possible, without departing from the scope and spirit of the invention.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A multi-function cutting tool, comprising:
   a cutting insert, including an upper surface, a lower surface, first cutting edge corner parts and second cutting edge corner parts, which are provided on respective corners of the upper surface such that the upper surface has a symmetrical structure with respect to a diagonal direction;
   a major cutting edge part provided between each of the first cutting edge corner parts and one second cutting edge corner part, and a first minor cutting edge part and a lowered cutting edge part provided between each of the first cutting edge corner parts and the remaining second cutting edge corner part; and
   a cutter body for supporting the cutting insert thereon, wherein the major cutting edge part has a downwardly inclined angle ranging from about 3° to 10°, and extends from the first cutting edge corner part towards the corresponding second cutting edge corner part, and, when seen in a front view of the cutting insert, the major cutting edge is defined by a convex curved line, which has a curvature radius of 1000 mm or more, the cutting insert further including a second minor cutting edge part provided between the major cutting edge part and the second cutting edge corner part.

2. The multi-function cutting tool according to claim 1, wherein a circular opening is perpendicularly formed through a central portion of the cutting insert, so that the cutting insert is mounted to the cutter body through the circular opening.

3. The multi-function cutting tool according to claim 1, wherein a major cutting edge side surface, connected between each of the major cutting edge parts and the lower surface, a second corner side surface, connected between each of the second cutting edge corner parts and the lower surface, a second minor cutting edge side surface, connected between each of the second minor cutting edge parts and the lower surface, and a lowered cutting edge side surface, connected between each of the lowered cutting edge part and the lower surface, are perpendicular to the lower surface.

4. The multi-function cutting tool according to claim 1, wherein the cutting insert further includes:
   a first minor cutting edge side surface and a first corner side surface, extending from each of the first minor cutting edge parts and from each of the first corner cutting edge parts, respectively, towards the corresponding lowered cutting edge side surface at inclination angles ranging from about 5° to 20°.

5. The multi-function cutting tool according to claim 3, wherein a height of a protruding portion of the first minor cutting edge side surface is equal to or less than a height of the cutting insert.

6. The multi-function cutting tool according to claim 1, wherein the first minor cutting edge part is farther than the lowered cutting edge part from a center of the cutting insert by a distance ranging from about 0.5 mm to 1.5 mm.

7. The multi-function cutting tool according to claim 3, wherein the cutting insert further includes:
   a first minor cutting edge side surface and a first corner side surface, extending from each of the first minor cutting edge parts and from each of the first corner cutting edge parts, respectively, towards the corresponding lowered cutting edge side surface at inclination angles ranging from about 5° to 20°.

8. A multi-function cutting tool, comprising:
   a cutting insert, including an upper surface, a lower surface, first cutting edge corner parts and second cutting edge corner parts, which are provided on respective corners of the upper surface such that the upper surface has a symmetrical structure with respect to a diagonal direction;
   a major cutting edge part provided between each of the first cutting edge corner parts and one second cutting edge corner part, and a first minor cutting edge part and a lowered cutting edge part provided between each of the first cutting edge corner parts and the remaining second cutting edge corner part;
   a cutter body for supporting the cutting insert thereon;
   wherein the cutting insert further includes a second minor cutting edge part provided between the major cutting edge part and the second cutting edge corner part; and
   wherein a major cutting edge side surface, connected between each of the major cutting edge parts and the lower surface, a second corner side surface, connected between each of the second cutting edge corner parts and the lower surface, a second minor cutting edge side surface, connected between each of the second minor cutting edge parts and the lower surface, and a lowered cutting edge side surface, connected between each of the lowered cutting edge part and the lower surface, are perpendicular to the lower surface.

9. The multi-function cutting tool according to claim 8, wherein the major cutting edge part has a downwardly inclined angle ranging from about 3° to 10°, and extends from the first cutting edge corner part towards the corresponding second cutting edge corner part.

10. The multi-function cutting tool according to claim 8, wherein the cutting insert further includes:
   a first minor cutting edge side surface and a first corner side surface, extending from each of the first minor cutting edge parts and from each of the first corner cutting edge parts, respectively, towards the corresponding lowered cutting edge side surface at inclination angles ranging from about 5° to 20°.

* * * * *